(12) United States Patent
Paulus et al.

(10) Patent No.: US 10,327,286 B2
(45) Date of Patent: Jun. 18, 2019

(54) GLAZING

(71) Applicant: PILKINGTON GROUP LIMITED, Nr. Ormskirk, Lancashire (GB)

(72) Inventors: Peter Paulus, Muenster (DE); Hidetoshi Oka, Ibaraki (JP); Mark Andrew Chamberlain, Ormskirk (GB); Tatsumi Tokuda, Ibaraki (JP)

(73) Assignee: PILKINGTON GROUP LIMITED, Nr. Ormskirk, Lancashire (GB)

( * ) Notice: Subject to any disclaimer, the term of this patent is extended or adjusted under 35 U.S.C. 154(b) by 326 days.

(21) Appl. No.: 15/034,802

(22) PCT Filed: Nov. 13, 2014

(86) PCT No.: PCT/GB2014/053373
§ 371 (c)(1),
(2) Date: May 5, 2016

(87) PCT Pub. No.: WO2015/071673
PCT Pub. Date: May 21, 2015

(65) Prior Publication Data
US 2016/0286609 A1 Sep. 29, 2016

(30) Foreign Application Priority Data

Nov. 16, 2013 (GB) .................................. 1320257.7

(51) Int. Cl.
*H05B 3/86* (2006.01)
*B32B 17/10* (2006.01)
(Continued)

(52) U.S. Cl.
CPC .......... *H05B 3/86* (2013.01); *B32B 17/10036* (2013.01); *B32B 17/10192* (2013.01);
(Continued)

(58) Field of Classification Search
CPC .......... H05B 3/86; H05B 3/84; H05B 1/0239; H05B 2203/007; H05B 2203/008;
(Continued)

(56) References Cited

U.S. PATENT DOCUMENTS

| 7,190,326 B2 | 3/2007 | Voeltzel |
| 2003/0080909 A1 | 5/2003 | Voeltzel |

(Continued)

FOREIGN PATENT DOCUMENTS

| DE | 195 08 042 A1 | 10/1995 |
| DE | 195 13 263 A1 | 10/1996 |

(Continued)

OTHER PUBLICATIONS

International Search Report (PCT/ISA/210) dated Apr. 8, 2015, by the European Patent Office as the International Searching Authority for International Application No. PCT/GB2014/053373.

(Continued)

*Primary Examiner* — Shawntina T Fuqua

(74) *Attorney, Agent, or Firm* — Buchanan Ingersoll & Rooney PC

(57) ABSTRACT

The invention relates to a heatable glazing comprising an electrically conductive coating and a data transmission window. The data transmission window comprises a plurality of grids made by ablations in the electrically conductive coating and at least one break line between adjacent grids. At least one of a width "a" of the grids and a distance "b" between adjacent grids is selected to maximise transmission of a predetermined frequency of electromagnetic radiation and to reduce the formation of hot spots. Preferred embodiments conform to a standard size of an ERTICO window and a frequency range from 5 GHz to 6 GHz.

23 Claims, 9 Drawing Sheets
(6 of 9 Drawing Sheet(s) Filed in Color)

(51) Int. Cl.
*C03C 17/00* (2006.01)
*H01Q 1/12* (2006.01)
*H01Q 15/00* (2006.01)
*H05B 3/84* (2006.01)
*H01Q 1/44* (2006.01)
*H05B 1/02* (2006.01)

(52) U.S. Cl.
CPC ........... *C03C 17/00* (2013.01); *H01Q 1/1278* (2013.01); *H01Q 1/44* (2013.01); *H01Q 15/0013* (2013.01); *H05B 1/0236* (2013.01); *H05B 3/84* (2013.01); *B32B 2605/006* (2013.01); *C03C 2218/328* (2013.01); *H05B 2203/007* (2013.01); *H05B 2203/008* (2013.01); *H05B 2203/013* (2013.01)

(58) Field of Classification Search
CPC ........ H05B 2203/013; B32B 17/10036; B32B 17/10192; B32B 2605/006; C03C 17/00; C03C 2218/328; H01Q 1/1278; H01Q 1/44; H01Q 15/0013
See application file for complete search history.

(56) References Cited

U.S. PATENT DOCUMENTS

2004/0200821 A1* 10/2004 Voeltzel ............ B32B 17/10036
219/203
2006/0267856 A1 11/2006 Voeltzel

FOREIGN PATENT DOCUMENTS

| DE | 10 2011 115 967 A1 | 4/2013 |
| EP | 0 717 459 A1 | 6/1996 |
| EP | 0 531 734 B1 | 11/1996 |
| EP | 1 559 167 B1 | 6/2013 |
| WO | WO 03/036758 A1 | 5/2003 |

OTHER PUBLICATIONS

Written Opinion (PCT/ISA/237) dated Apr. 8, 2015, by the European Patent Office as the International Searching Authority for International Application No. PCT/GB2014/053373.

* cited by examiner

GLAZING

BACKGROUND OF THE INVENTION

The invention relates to a glazing having a data transmission window.

Glazings are known comprising an electrically conductive coating. For example, an electrically conductive coating in a windshield may reflect infrared radiation, to prevent rapid heating of an interior of a vehicle by the sun, or may carry electric current for heating the windshield resulting in demisting or defrosting.

A known problem with such electrically conductive coatings is that transmission of communication signals is at least partly blocked. A windshield having an electrically conductive coating would at least partly block transmission of data for a navigation device (GPS), a mobile telephone or a toll collection device so these devices would not function in a vehicle fitted with the windshield. Therefore it is desirable to provide a means to allow transmission of a predetermined frequency of electromagnetic radiation through a windshield having an electrically conductive coating.

EP0531734B1 (Central/Nakashima) discloses a laminated panel, comprising a layer which is relatively high in reflectance for radio waves, said layer being divided into a plurality of segments by a series of slits. In a preferred embodiment, the width of each segment is 1/30 of the wavelength selected for transmission, whereby the reflectance of said layer for said radio wave is reduced. For example, to allow transmission of a signal of frequency 200 MHz (wavelength 1,500 mm) a width of each segment is 50 mm.

DE19508042A1 (NSG/Tsuno) also discloses an electrically conductive coating for transmission of electrical signals and reflection of heat, being divided into a plurality of segments by a series of slits, such that a width of each segment is less than 1/10 of the wavelength selected for transmission. For example, for transmission of a signal of frequency 2 GHz, a width of each segment is preferably less than 1 cm.

Both EP0531734B1 and DE19508042A1 provide an electrically conductive coating which is not electrically heatable, because it is divided into segments.

EP1559167B1 (AGC/Roquiny) provides a vehicle glazing panel, comprising a radiation-reflective coating layer and a window in the coating layer permeable to electromagnetic radiation. Typical electromagnetic wave frequencies are, for example, 88-108 MHz, 540-1650 kHz, 150-280 kHz, for radio signals; 890-960 MHz, 1710-1880 MHz, 1900-2170 MHz for mobile phone communications; 1575.42+/−10 MHz for GPS; and 5.8 GHz for Dedicated Short Range Communications (DSRC), such as toll collection. The window is a zone wherein the coating layer is absent from a pattern of dots. The dots form uncoated apertures in the coating layer and are arranged linearly or in alternate rows. Each dot has a diameter between 5 and 7 mm. The pattern of dots may increase the directivity of the transmission by focussing the signal, i.e. transmission through the pattern of dots can be greater than through a reference windscreen without a coating layer. The vehicle glazing panel may also be heated. The pattern of dots without coating allows the glazing panel to be heated substantially uniformly. Hot spots which may damage the coating layer are avoided. A disadvantage is that solar performance is sacrificed because a significant area of coating layer is absent. A square of width 6 cm and height 6 cm comprising 64 dots without coating layer of 6 mm diameter each has only 50% coated area remaining, so solar performance is sacrificed.

U.S. Pat. No. 7,190,326B2 (PPG/Voeltzel) provides an electrically conductive coating of an automotive heatable windshield, comprising a communication window, i.e. a frequency selective surface (FSS). The FSS comprises passing areas (uncoated areas) and blocking areas (coated areas) to pass and block respectively predetermined wavelengths of the electromagnetic spectrum. Passing areas and blocking areas may be arranged in a number of columns, defined by ablations, spaced from one another by a continuous elongated blocking area. Busbars for supplying heating current to the electrically conductive coating may be oriented above and below the columns so that current flows between adjacent columns to avoid the formation of hot spots. The smaller the distance between adjacent columns, the more the reduction in intensity of hot spots.

DE-102011115967A1 (Daimler/Frosch) discloses advantageous patterns of ablations in an electrically conductive coating in a windshield, resulting in areas of improved transmission at a predetermined frequency. Ablations are interrupted at crossing points so that electrical continuity is maintained, thus electrical heating is not disadvantaged.

It is an object of the present invention to provide an alternative heatable glazing, comprising an area with maintained or improved data transmission and improved uniformity of heating and maintained or improved solar performance, compared with a conventional data transmission window.

SUMMARY OF THE INVENTION

According to a first aspect of the present invention, a heatable glazing is provided comprising the features set out in claim 1 attached hereto.

The present invention offers an alternative heatable glazing having an area which provides a path for electrical current for heating and at the same time provides improved transmission of electromagnetic radiation in a selected frequency range.

A benefit is achieved by providing grids, i.e. ablations arranged to form segments in rows and columns, and at least a break line, i.e. an ablation arranged between adjacent grids, which cooperate to define a data transmission window. Transmission of vertically polarised electromagnetic radiation through a data transmission window according to the present invention is greater than through a conventional data transmission window having a full grid.

Surprisingly, the inventor has found that provision of a break line according to the invention increases transmission of a selected frequency. Data from computer simulation, using software known in the art, is evidence of this benefit.

A glazing according to the invention comprising a break line is capable of maximising transmission of electromagnetic radiation at a predetermined frequency such that transmission through the data transmission window is greater than through a reference glazing without coating. The amount of coating ablation according to the invention is less than the amount of coating ablation in a data transmission window having a pattern of dots. A segment of width 1 mm having an ablation of width 0.05 mm has 90% coated area remaining, so solar performance is approximately maintained.

Preferably the width "a" of the grids is in a range from 4 to 10 mm.

Preferably the width "a" of the grids is in a range from 4 to 6 mm.

Preferably the width "a" of the grids is in a range from 5 to 6 mm.

Preferably the distance "b" between adjacent grids is in a range from 1 to 4 mm.

Preferably the distance "b" between adjacent grids is in a range from 2 to 4 mm.

Preferably the distance "b" between adjacent grids is in a range from 3 to 4 mm.

Preferably a height "c" of the grids is greater than the width "a" of the grids.

Preferably a height "c" of the grids is in a range from 50 to 100 mm.

Preferably the height "c" of the grids is in a range from 65 to 75 mm.

Preferably a width "d" of the data transmission window is greater than three times the sum of the width "a" of the grids and the distance "b" between adjacent grids, i.e. "d>3(a+b)".

Preferably the width "d" of the data transmission window is in a range from 50 to 200 mm.

Preferably the width "d" of the data transmission window is in a range from 130 to 140 mm.

Preferably a width "e" of each segment of the grids is in a range from 0.5 to 5 mm.

Preferably the heatable glazing further comprises a top busbar and a bottom busbar arranged substantially at right angles to the break lines.

Preferably the predetermined frequency of electromagnetic radiation is in the range from 3 to 10 GHz.

Preferably the predetermined frequency of electromagnetic radiation is in the range from 5 to 6 GHz. More preferably, the predetermined frequency of electromagnetic radiation is 5.8 GHz.

Preferably the transmission of electromagnetic radiation at the predetermined frequency through the data transmission window relative to transmission of electromagnetic radiation at the predetermined frequency in free space is greater than or equal to −3 dB. More preferably, said transmission is greater than or equal to −0.5 dB.

Preferably a percentage conductive width of the data transmission window is greater than or equal to 25%. More preferably, the percentage conductive width of the data transmission window is greater than or equal to 35%.

Preferably the width "a" of the grids and the distance "b" between adjacent grids are selected to be integer multiples "A" and "B" of a width "e" of each segment of the grids.

Preferably a height "c" of the grids is selected to be an integer multiple "C" of the width "e" of the width of each segment of the grids.

Preferably the heatable glazing comprises first and second plies of interlayer material, between first and second plies of glazing material and the electrically conductive coating is on a carrier film, between the first and second plies of interlayer material.

Alternatively the heatable glazing comprises a ply of interlayer material, between first and second plies of glazing material and the electrically conductive coating is on a surface of the first or second plies of glazing material, and is in contact with the ply of interlayer material (41).

An advantage of the invention is that formation of hot spots is avoided due to multiple current paths provided in the data transmission window. Current paths can be aligned substantially perpendicular to top and bottom busbars, due to the break lines aligned vertically between adjacent grids.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention will now be described by means of non-limiting examples with reference to the attached figures.

DETAILED DESCRIPTION OF THE INVENTION

Figure 1:
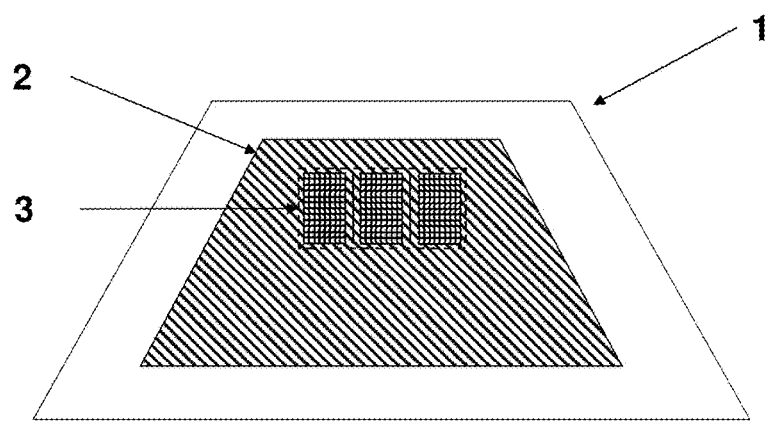
FIG. 1 shows a glazing according to the invention in plan view.

FIG. 1 shows a glazing 1 according to the invention suitable for a vehicle windshield. In all the drawings and description, vertically refers to vertical orientation of the glazing 1, for example as installed in a vehicle. The glazing 1 comprises an electrically conductive coating 2, suitable for solar control. Such coatings are known in the art. The electrically conductive coating 2 comprises a data transmission window 3, suitable for allowing transmission of electromagnetic radiation at a predetermined frequency.

The electrically conductive coating 2 prevents transmission at radio frequencies. Attenuation of transmission is in the range from −25 to −35 dB.

The data transmission window 3 may be a standard size, such as defined in a standard of a European Intelligent Transport Systems Organisation (ERTICO), of height 70 mm and width 120 mm.

Ablations in the electrically conductive coating 2 within the data transmission window 3 may be made by laser treatment known in the art. Ablations are made to form grids, comprising segments in rows and columns. A width of each segment is also known as the grid pitch and is approximately 1 mm. Ablations are formed having width approximately 50 to 100 micrometres.

Grids provide radio frequency transmission but hinder DC heating currents, so a conventional data transmission window in a heatable glazing is a non-heated area and hot spots are formed at the edges of the data transmission window. So there is a long felt need to find the best compromise between heating uniformity, radio frequency transmission and solar performance.

The present invention allows DC currents to flow vertically in part of the data transmission window 3, by providing a plurality of grids, i.e. providing a current path in the gap between adjacent grids.

Furthermore the present invention maintains the grid pattern in the vertical direction, by means of one or more break lines between adjacent grids, maintaining radio frequency performance for horizontally polarised waves. Horizontal electrical currents in gaps between adjacent grids are blocked by the break lines, aligned vertically.

Figure 2:
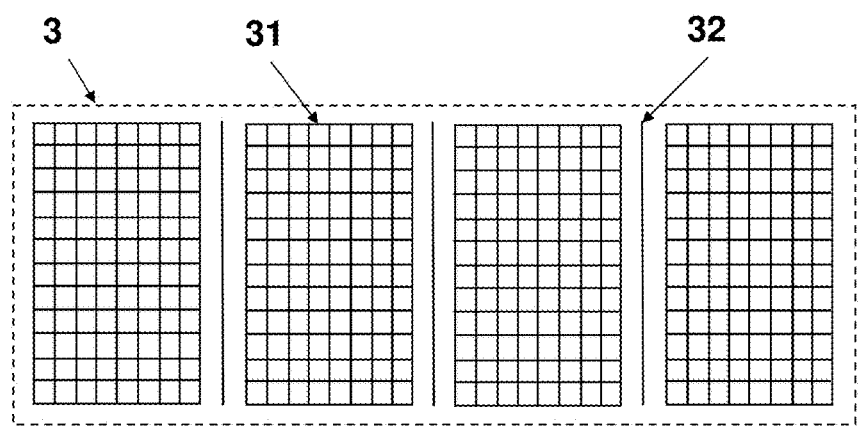
FIG. 2 shows a data transmission window according to the invention with four grids, each separated by a break line.

FIG. 2 shows a data transmission window 3 in more detail, comprising four grids 31. Between each grid 31 is a break line 32.

Figure 3:
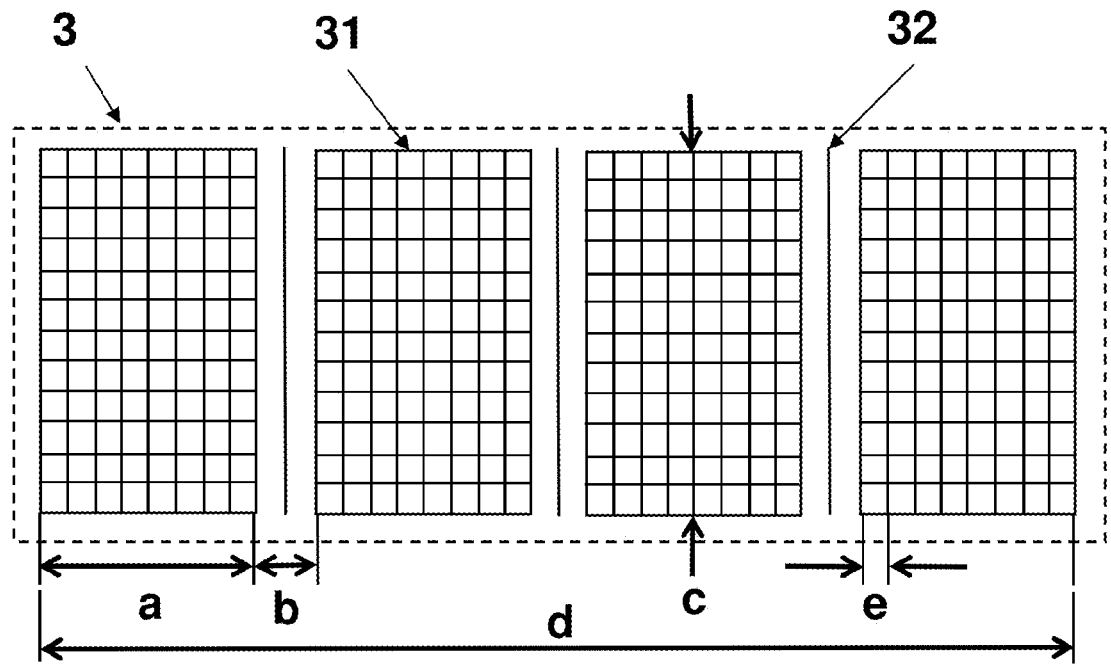
FIG. 3 shows the data transmission window of FIG. 2 with parameters "a" to "e".

FIG. 3 shows a data transmission window 3 with defined by five parameters "a" to "e". A width of the grids 31 is "a". A distance between adjacent grids 31 is "b". A height of the grids is "c". A width of the data transmission window 3 is "d". A width of each segment of the grids 31 is "e".

Figure 4:
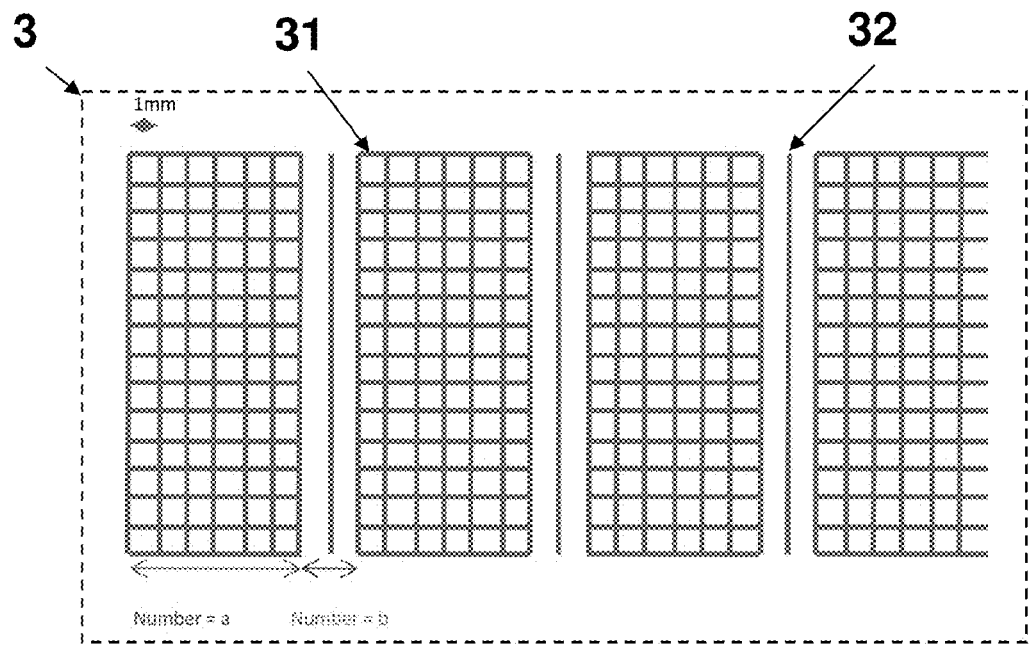
FIG. 4 shows a data transmission window according to the invention with four grids, each separated by a break line so "b"=2, each grid having "a"=6 and "c"=14.

FIG. 4 shows a data transmission window 3 comprising four grids 31, each comprising six segments horizontally. Between each grid 31 is a break line 32. In this embodiment, the width of a segment is 1 mm and a distance between grids 31 and an adjacent break line 32 is 1 mm. So the width "a" of grids 31 and the distance "b" between adjacent grids 31 are easily measured in millimetres by counting the number of gaps between ablations. In this case "a" is 6 mm and "b" is 2 mm, which may be conveniently written "a6, b2". In this figure one ablation on the right edge has been omitted to indicate that the pattern repeats to fill a required width "d". A preferred embodiment for an ERTICO window consists of 15 grids of dimensions "a6, b2".

Figure 5:
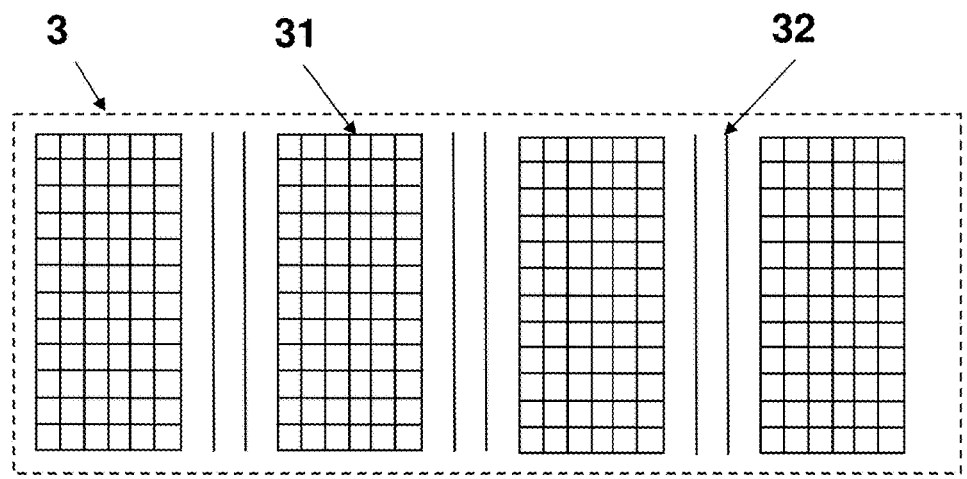
FIG. 5 shows a data transmission window according to the invention with four grids, each separated by two break lines, such that "a"=6 and "b"=3.

FIG. 5 shows a preferred embodiment, in which the data transmission window 3 comprises a plurality of grids 31, each comprising six segments horizontally, and two break lines 32 are arranged between adjacent grids, i.e. "a6, b3", if "e"=1 mm. To fill an ERTICO window, the number of grids 31 is more than 15 if "e" is less than 1 mm. An alternative requirement for a width "d" 135 mm requires 17 grids if "e" is 1 mm. Although 12 vertical segments are shown for convenience, 70 vertical segments are needed to fill an ERTICO window if "e" is 1 mm.

Figure 6:
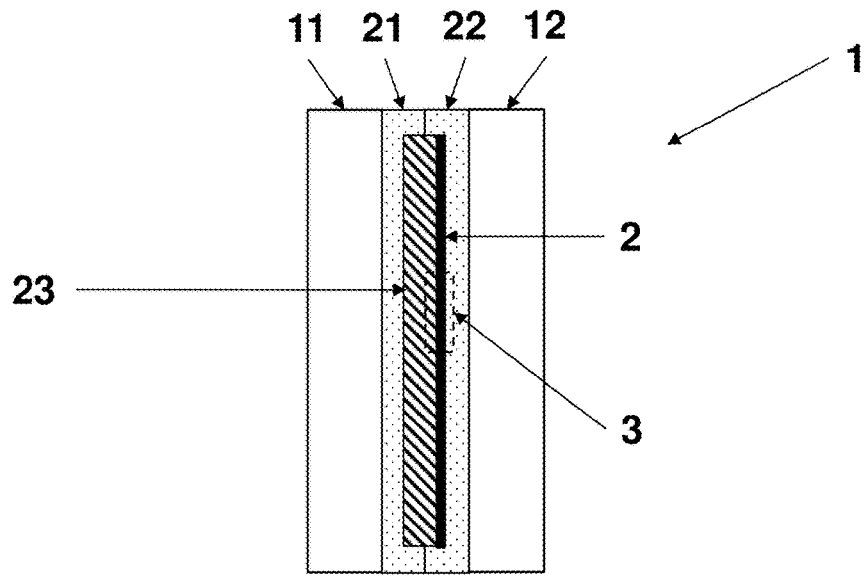
FIG. 6 shows a cross-section of a glazing according to the invention comprising an electrically conductive coating on a carrier film.

FIG. 6 shows a cross-section of a preferred embodiment, in which the glazing 1 comprises first and second plies of interlayer material 21, 22 between first and second plies of glazing material 11, 12. An electrically conductive coating 2 is on a carrier film 23, between the first and second plies of interlayer material 21, 22. A data transmission window 3 is provided in the electrically conductive coating 2.

In an alternative embodiment (not shown), the glazing 1 comprises a ply of interlayer material 21 between first and second plies of glazing material 11, 12. An electrically conductive coating 3 is on a surface of the first ply or the second ply of glazing material 11, 12 and is in contact with the ply of interlayer material 21. This has the advantage of a simpler manufacturing process.

EXAMPLES

Examples of the present invention were analyzed by computer simulation. A known Transmission Line Matrix (TLM) method of differential numerical modelling of electromagnetic field problems was used to simulate radio frequency transmission. A data transmission window 3 in each example has width 135 mm and height 70 mm and the glazing is two sheets of float glass, thickness 2.1 mm, bonded together by a ply of interlayer, thickness 0.7 mm. Width "e" of a segment is 1 mm.

Temperature distribution was also modelled, based on 42 V, to identify maximum temperature in each example. A hot spot could be dangerous if touched by a person and could damage the coating, interlayer material or glazing. A maximum temperature in a range from 80 to 90° C. is a preferred.

Figure 7:
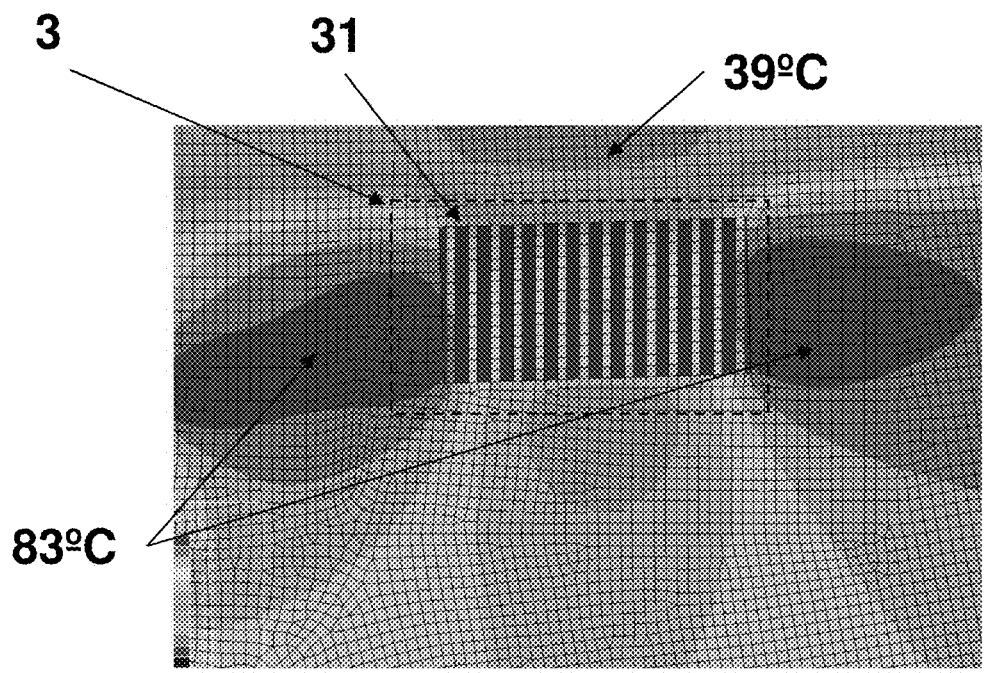
FIG. 7 shows a temperature distribution of a glazing according to the invention having "a"=6 and "b"=4 and a maximum temperature 83° C.

FIG. 7 shows a temperature distribution of a glazing according to the invention having "a"=6 and "b"=4 and a maximum temperature 83° C. The distance "b" between adjacent grids 31, i.e. the DC path, is wide to minimise hot spots.

Figure 8:
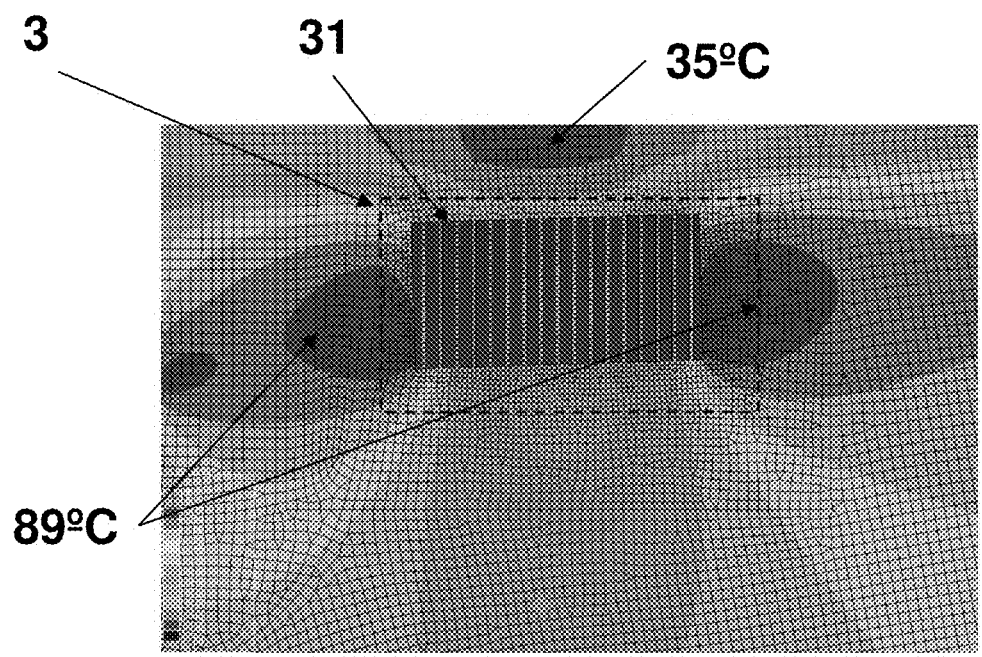
FIG. 8 shows a temperature distribution of a glazing according to the invention having "a"=6 and "b"=2 and a maximum temperature 89° C.

FIG. 8 shows a temperature distribution of a glazing according to the invention having "a"=6 and "b"=2 and a maximum temperature 89° C. The DC path is narrower than in FIG. 7, so that a repeating distance "a+b" of grids 31 is 8 mm. Therefore the data transmission window 3 contains more grids than in FIG. 7.

Figure 9:
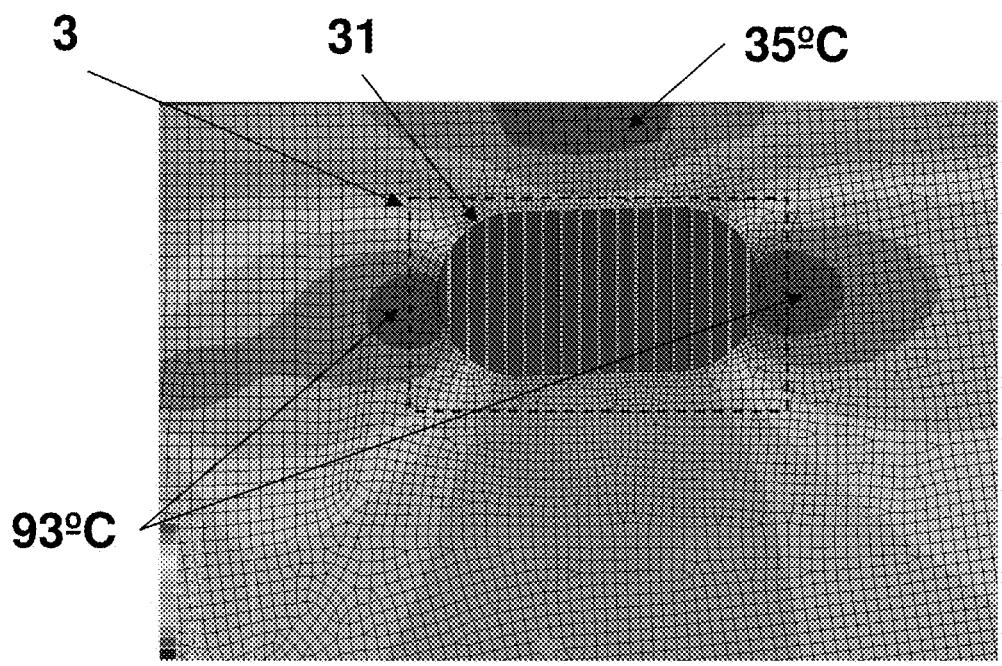
FIG. 9 shows a temperature distribution of a glazing according to the invention having "a"=6 and "b"=2 and the data transmission window having rounded corners and a maximum temperature 93° C.

FIG. 9 shows a temperature distribution of a glazing according to the invention having "a"=6 and "b"=2 and the data transmission window 3 has rounded corners and a maximum temperature 93° C.

Figure 10:
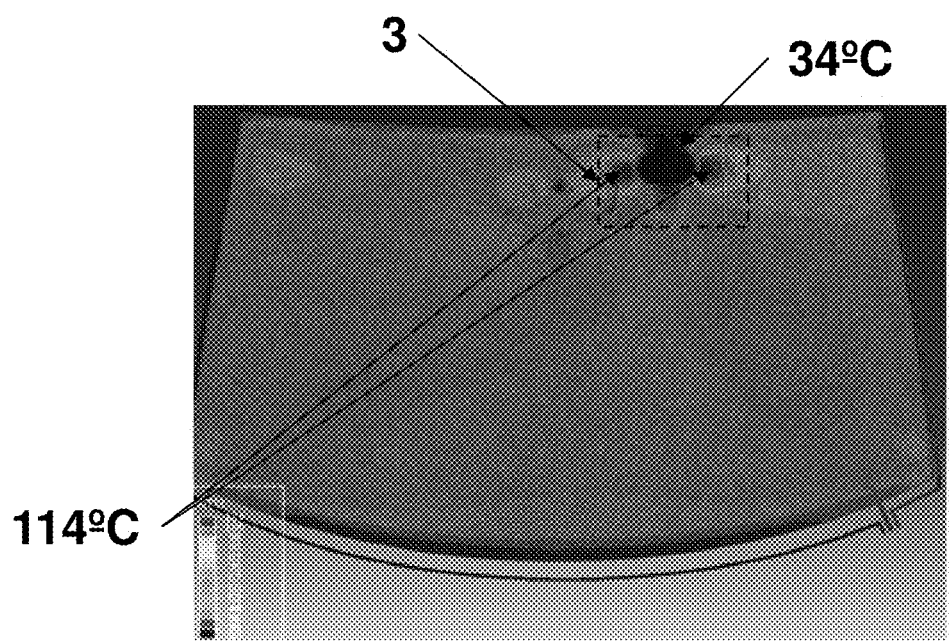
FIG. 10 shows a temperature distribution of a glazing according to the prior art, comprising a full grid data transmission window, having maximum temperature 114° C.

FIG. 10 shows a temperature distribution of a glazing according to the prior art, comprising a full grid data transmission window, having maximum temperature 114° C. In this comparative example, a single grid fills a conventional ERTICO window 3. The hot spot temperature is unacceptable.

Figure 11:
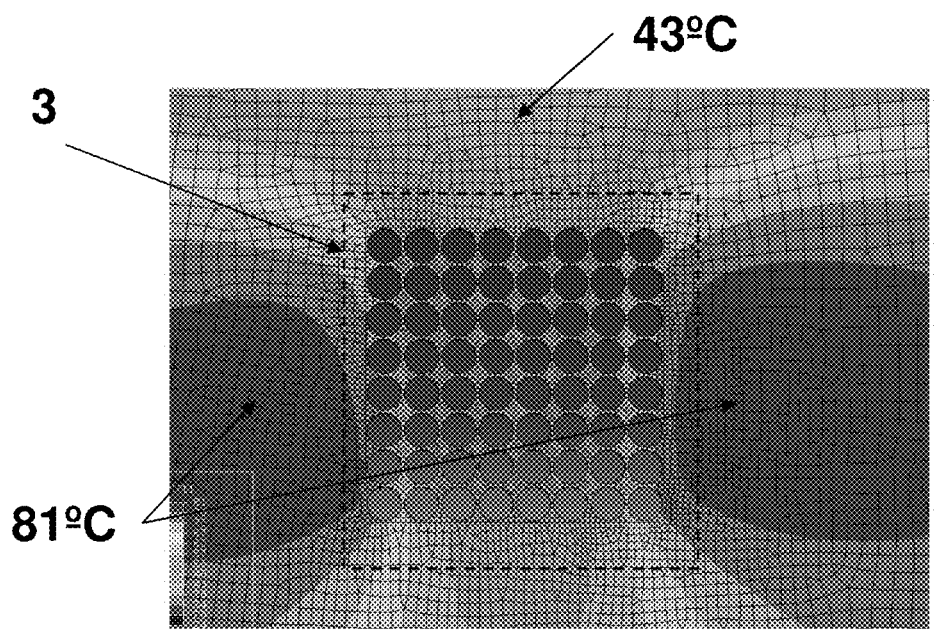
FIG. 11 shows a temperature distribution of a glazing according to the prior art, comprising a pattern of dots, having maximum temperature 81° C. and only 50% coated area remaining.

FIG. 11 shows a temperature distribution of a glazing according to the prior art EP1559167 (AGC/Roquiny), comprising a pattern of dots, having maximum temperature 81° C. and only 50% coated area remaining. Although hot spots are avoided, solar performance is sacrificed in the data transmission window 3.

Figure 12:
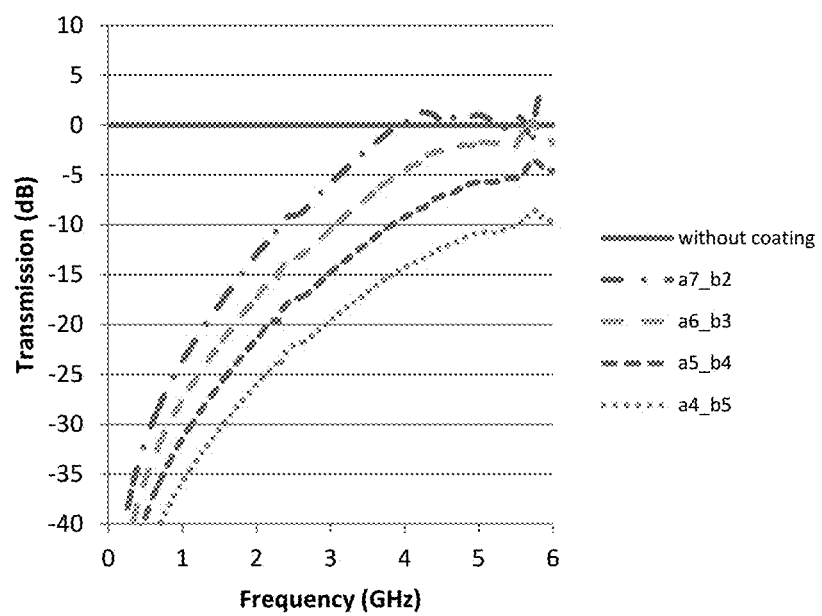
FIG. 12 shows a chart of transmission versus frequency in the range from 0.1 to 6 GHz for four glazings according to the invention, and a reference glazing without coating.

FIG. 12 shows a chart of transmission versus frequency in the range from 0.1 to 6 GHz for four glazings according to the invention, and a reference glazing without coating. A repeating distance "a+b" of grids 31 is 8 mm in all four glazings. As width "a" of the grids increases, a larger window for vertically polarized radio frequency waves is provided, so transmission increases.

Figure 13:
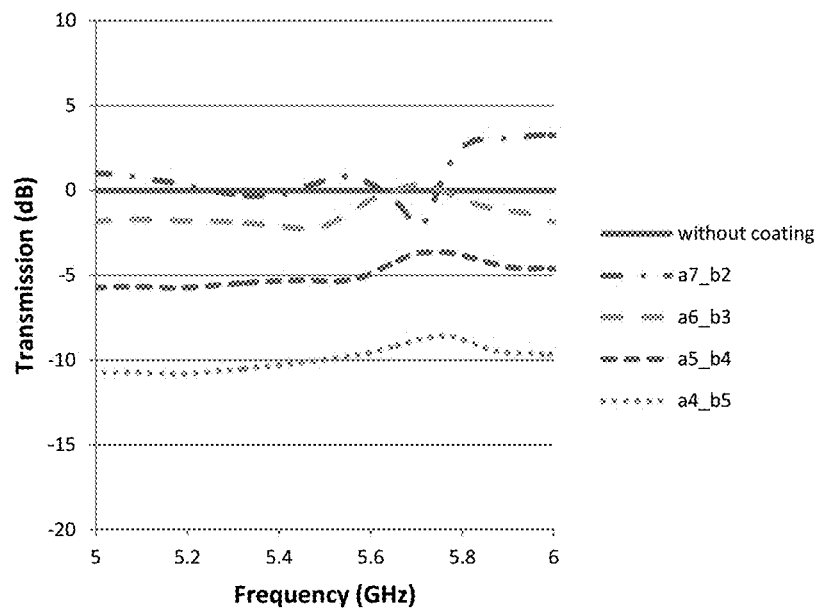
FIG. 13 shows a chart of transmission versus frequency in the range from 5 to 6 GHz for four glazings according to the invention, and a reference glazing without coating.

FIG. 13 shows a chart of transmission versus frequency in the range from 5 to 6 GHz for four glazings according to the invention, and a reference glazing without coating. FIG. 13 is a high resolution section of FIG. 12. Frequency dependence is observed, such that a transmission is maximised at a predetermined frequency of electromagnetic radiation. A maximum occurs at 5.7 GHz for a width "a" of the grids 31 in the range 4 to 6 mm, i.e. a distance "b" between grids 31 in the range from 3 to 5 mm. A different effect occurs for "a" greater than or equal to 7 mm, i.e. "b" less than or equal to 2 mm. Transmission performance is similar to a comparative example of a glazing without coating for "a6, b3". In this example, combinations of "a" and "b" are selected such that a+b=9.

Figure 14:
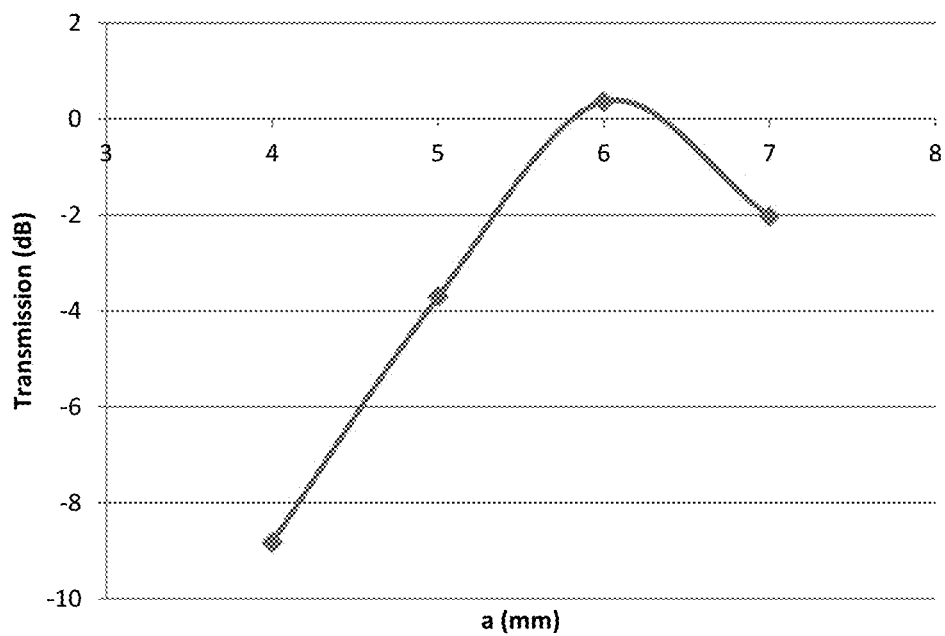
FIG. 14 shows a chart of transmission at 5.7 GHz versus width of grids for four glazings according to the invention, showing a maximum at "a"=6 mm.

FIG. 14 shows a chart of transmission at 5.7 GHz versus width of grids for the four glazings of FIG. 13 according to the invention, showing a maximum at "a"=6 mm. FIG. 14 shows optimization analysis for a width "a" of the grids 31 in cooperation with a distance "b" between adjacent grids 31. FIG. 13 and FIG. 14 together show that for a given frequency and a repeating distance "a+b" there is an optimum, i.e. a maximum.

Surprisingly the inventors have found that for linear polarised vertical waves a field distribution is obtained which results in optimal transmission for a given frequency. After ablations according to the invention, typically 90% of the electrically conductive coating 2 in the data transmission window 3 remains, so solar performance is not sacrificed. Maximum temperature is in the range from 80 to 90° C. so hot spots are avoided.

Experimental results for linear polarisation are for the critical case, which is vertical. Horizontal polarisation is not affected by choosing different values for "a" or "b", because horizontal currents are not significantly affected by vertical current paths in the gap between adjacent grids. Some communication systems, for example for toll collection, have circular polarisation. The present invention is applicable for circular polarisation, even though the effects presented above are less pronounced.

In a further embodiment according to the invention, both radio frequency transmission and heating uniformity are optimised. Heating uniformity is expected to improve as a distance "b" between adjacent grids increases. On the other hand, radio frequency transmission is optimised by selecting a width "a" of the grids and a distance "b" between adjacent grids in a particular combination. Prior art does not disclose a glazing in which a width "a" of the grids and a distance "b" between adjacent grids are selected together to optimise both radio frequency transmission and heating uniformity.

According to the invention, an indicator of heating uniformity is a percentage conductive width, calculated as b/(a+b). The percentage conductive width quantifies the average conductance for DC heating of a proposed plurality of grids compared to the coating without laser ablations.

Figure 15:
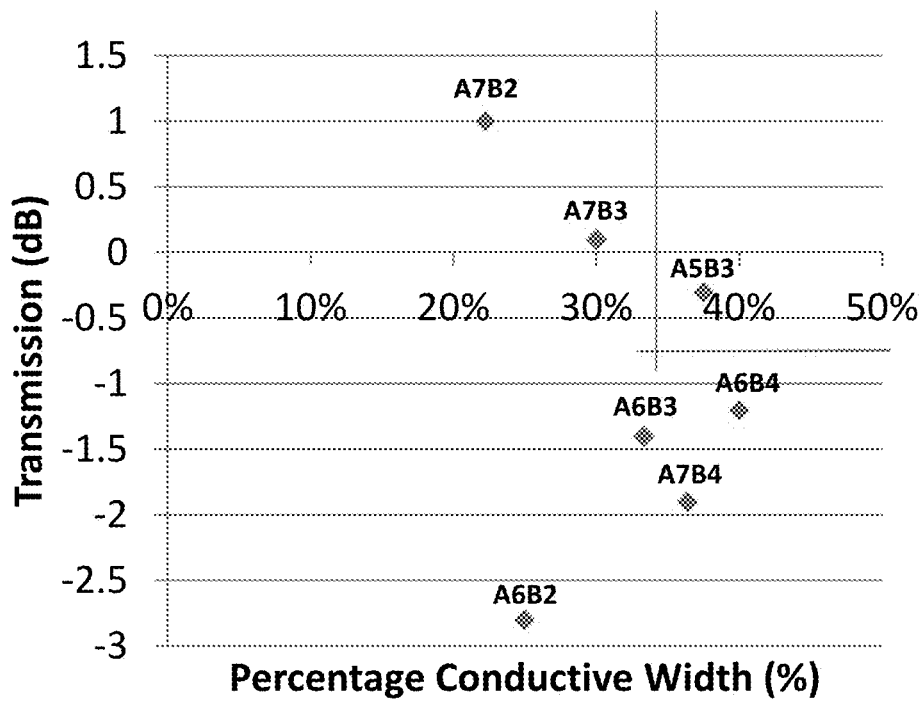
FIG. 15 shows a chart of transmission at 5.8 GHz versus percentage of conductive width for seven glazings according to the invention.

FIG. 15 is a chart of transmission at 5.8 GHz versus percentage of conductive width for seven glazings according to the invention, from experimental results using circular polarisation. An advantage of using percentage conductive width as an independent variable is embodiments of the invention which are best for heating uniformity are shown to the right.

Figure 16:
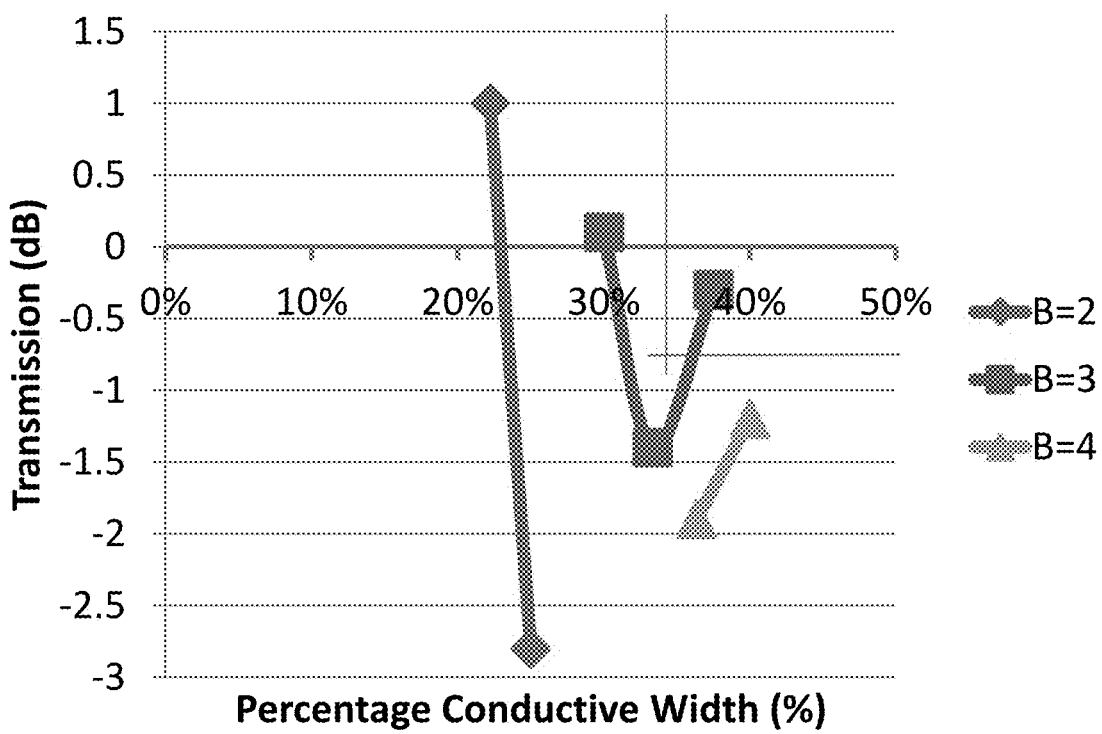
FIG. 16 shows a chart of the same data as FIG. 15, grouped by distance "b" between adjacent grids, showing a transmission threshold of −0.5 dB and a percentage conductive width threshold of 35%.

FIG. 16 shows a chart of the same experimental results as FIG. 15, grouped by distance "b" between adjacent grids. Generally as "b" increases, heating uniformity improves. Thresholds for radio frequency transmission and percentage conductive width are applied. For example, a transmission threshold of −0.5 dB and a percentage conductive width threshold of 35% are applied. Both thresholds are exceeded by a5, b3. This embodiment represents an optimum of −0.3 dB radio frequency transmission (nearly equal to free space) and allows 3/(5+3)=37.5% of conductive width for heating.

Figure 17:
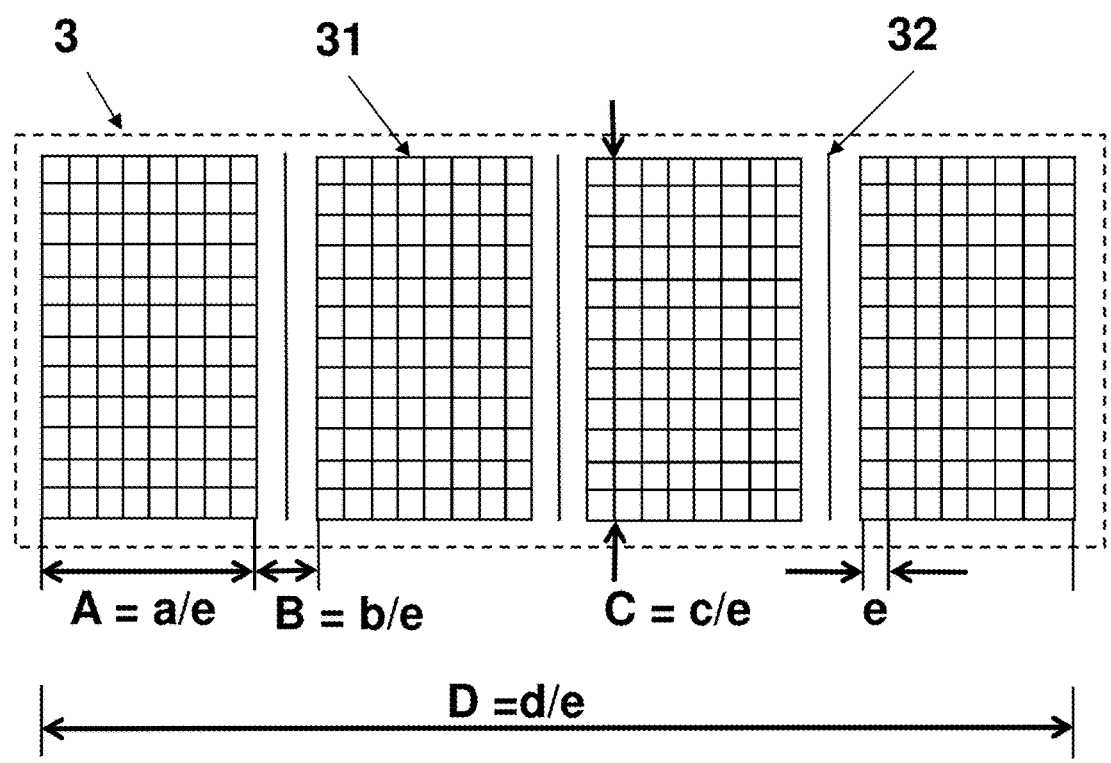
FIG. 17 shows dimensionless variables "A", "B", "C" and "D" based on unit width "e".

FIG. 17 shows a glazing according to the invention wherein variables "a", "b", "c" and "d" are integer multiples of width "e" of each segment. Thus dimensionless variables "A", "B", "C" and "D" are defined, counting in units of "e". An advantage of this embodiment is that grids have an integer number of segments, which makes selection of dimensions easier.

The invention claimed is:

1. A heatable glazing comprising:
   an electrically conductive coating
   a data transmission window in the electrically conductive coating
   wherein the data transmission window comprises:
      a plurality of ablations in the electrically conductive coating, arranged to provide a plurality of grids, the grids comprising segments in rows and columns;
      at least a break line, each break line an ablation arranged between adjacent grids; and
      at least one of a width "a" of the grids and a distance "b" between adjacent grids is selected to maximise transmission of a predetermined frequency of electromagnetic radiation for horizontally polarized waves wherein the one or more break lines are aligned vertically.

2. A heatable glazing according to claim 1, wherein the width "a" of the grids is in the range from 4 to 10 mm.

3. A heatable glazing according to claim 2, wherein the width "a" of the grids is in the range from 4 to 6 mm.

4. A heatable glazing according to claim 3, wherein the width "a" of the grids is in the range from 5 to 6 mm.

5. A heatable glazing according to claim 1, wherein the distance "b" between adjacent grids is in the range from 1 to 4 mm.

6. A heatable glazing according to claim 5, wherein the distance "b" between adjacent grids is in the range from 2 to 4 mm.

7. A heatable glazing according to claim 6, wherein the distance "b" between adjacent grids is in the range from 3 to 4 mm.

8. A heatable glazing according to claim 1, wherein a height "c" of the grids is greater than the width "a" of the grids.

9. A heatable glazing according to claim 8, wherein a height "c" of the grids is in the range from 50 to 100 mm.

10. A heatable glazing according to claim 9, wherein the height "c" of the grids is in the range from 65 to 75 mm.

11. A heatable glazing according to claim 1, wherein a width "d" of the data transmission window is greater than three times the sum of the width "a" of the grids and the distance "b" between adjacent grids, i.e. "d>3(a+b)".

12. A heatable glazing according to claim 1, wherein a width "d" of the data transmission window is in the range from 50 to 200 mm.

13. A heatable glazing according to claim 12, wherein the width "d" of the data transmission window is in the range from 130 to 140 mm.

14. A heatable glazing according to claim 1, wherein a width "e" of each segment of the grids is in the range from 0.5 to 5 mm.

15. A heatable glazing according to claim 1, wherein the heatable glazing further comprises a top busbar and a bottom busbar arranged substantially at right angles to the break lines.

16. A heatable glazing according to claim 1, wherein the predetermined frequency of electromagnetic radiation is in the range from 3 to 10 GHz.

17. A heatable glazing according to claim 16, wherein the predetermined frequency of electromagnetic radiation is in the range from 5 to 6 GHz.

18. A heatable glazing according to claim 1, wherein the transmission of electromagnetic radiation at the predetermined frequency through the data transmission window relative to free space is greater than or equal to −3 dB.

19. A heatable glazing according to claim 1, wherein a percentage conductive width b/(a+b) of the data transmission window is greater than or equal to 25%.

20. A heatable glazing according to claim 1, wherein the width "a" of the grids and the distance "b" between adjacent grids are selected to be integer multiples "A" and "B" of a width "e" of each segment of the grids.

21. A heatable glazing according to claim 14, wherein a height "c" of the grids is selected to be an integer multiple "C" of the width "e" of each segment of the grids.

22. A heatable glazing according to claim 1, wherein the heatable glazing comprises first and second plies of interlayer material, between first and second plies of glazing material and wherein the electrically conductive coating is on a carrier film, between the first and second plies of interlayer material.

23. A heatable glazing according to claim 1, wherein the heatable glazing comprises a ply of interlayer material, between first and second plies of glazing material and wherein the electrically conductive coating is on a surface of the first ply or the second ply of glazing material, and is in contact with the ply of interlayer material.

* * * * *